United States Patent [19]

Pinkston

[11] 4,414,184

[45] Nov. 8, 1983

[54] APPARATUS FOR MIXING CHEMICAL COMPONENTS

[75] Inventor: Bruce H. W. Pinkston, Cleveland, Ohio

[73] Assignee: Union Carbide Corporation, Danbury, Conn.

[21] Appl. No.: 361,193

[22] Filed: Mar. 24, 1982

Related U.S. Application Data

[63] Continuation of Ser. No. 237,242, Feb. 23, 1981, abandoned, which is a continuation of Ser. No. 115,623, Jan. 28, 1980, abandoned.

[51] Int. Cl.³ .................................................. B01F 5/06
[52] U.S. Cl. ..................................... 422/133; 239/432; 239/434.5; 252/359 E; 261/DIG. 26; 422/224; 366/336
[58] Field of Search ............................. 422/133, 224; 261/DIG. 26; 252/359 E; 521/917, 112; 366/69, 96, 336; 239/432, 434.5

[56] References Cited

U.S. PATENT DOCUMENTS 3,941,355 3/1976 Simpson .............................. 366/336
4,054,273 10/1977 Neuman ............................... 366/96

Primary Examiner—Michael S. Marcus
Attorney, Agent, or Firm—Donald M. Papuga

[57] ABSTRACT

Described herein is an apparatus for producing a mixture of chemical components which comprises an elongated housing containing (a) a tube extending therethrough having at least one inlet means for supplying at least one component into said tube whereby said components flow from said inlet means to outlet means at the other end of said tube; (b) inlet means for supplying at least one component either reactive with one or more components of (a) or catalyzing the reaction of two or more components of (a), said inlet means in communication with an annular groove within a conical member which receives said component(s), (c) means for distributing said component(s) from the annular groove to a plurality of grooves in said conical member, said grooves directing the component(s) into the flow of the component(s) of (a) in said tube.

2 Claims, 4 Drawing Figures

U.S. Patent     Nov. 8, 1983     4,414,184
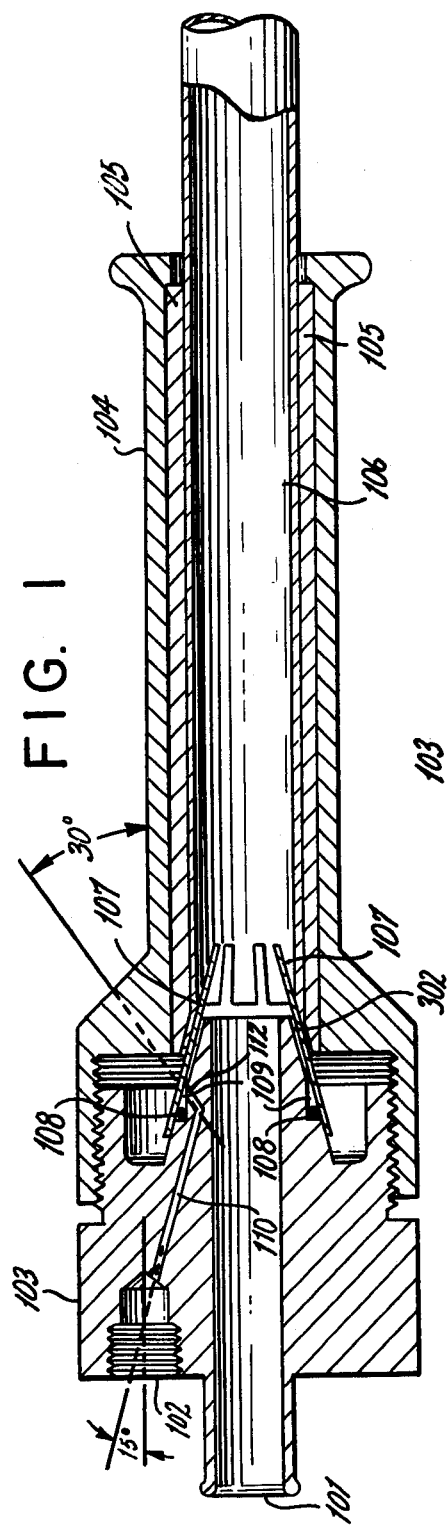
FIG. 1
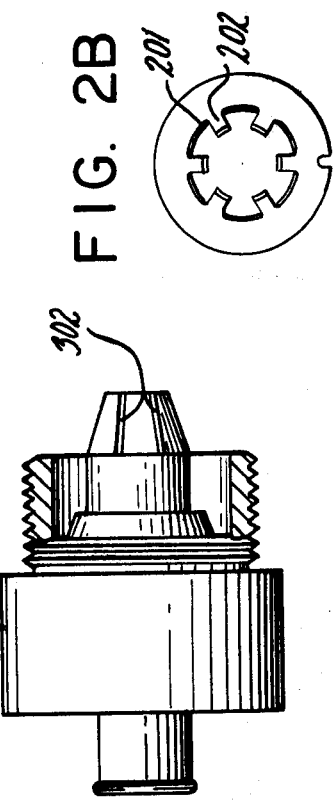
FIG. 2B
FIG. 3
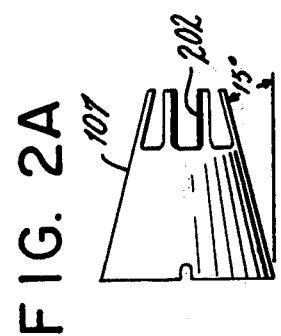
FIG. 2A

APPARATUS FOR MIXING CHEMICAL COMPONENTS

This application is a continuation of our prior U.S. application: Ser. No. 237,242 filed Feb. 23, 1981 abandoned which is a continuation of application 115,623 1 Jan. 28, 1980 abandoned.

This invention is directed to an apparatus for continuously producing a mixture of chemical components.

Many chemically reactive components, such as polyurethane-forming components and a polyurethane forming catalyst react to form viscous products within a very short period of time. It is difficult to combine these reactive components with their catalysts and to apply the resulting mixture in a single continuous operation. This is especially true when the polyurethane is in the form of a froth and an attempt is made to catalyze the froth to promote its cure. Proper and complete mixing of the catalyst and froth are critical to prevent premature curing from taking place which could block any dispensing means. Also, the quantity relationship between the catalyst and other components is often quite critical, with the catalyst being added in very small quantities in comparison to the overall system. It has been quite difficult to completely and uniformly mix such a small quantity of material with the large quantity of materials.

The apparatus of this invention permits continuous mixing of components particularly when one of the components is reactive or is used in a small quantity (minor component) such as in a catalytic amount.

THE INVENTION

This invention is directed to an apparatus for producing a mixture of chemical components which comprises an elongated housing containing (a) a tube extending therethrough having at least one inlet means for supplying at least one component into said tube whereby said components flow from said inlet means to outlet means at the other end of said tube; (b) inlet means for supplying at least one component either reactive with one or more components of (a) or catalyzing the reaction of two or more components of (a), said inlet means in communication with an annular groove within a conical member which receives said component(s), (c) means for distributing said component(s) from the annular groove to a plurality of grooves in said conical member, said grooves directing the component(s) into the flow of the component(s) of (a) in said tube.

The apparatus of this invention is used to continuously mix one or more chemical components, particularly reactive components or to catalyze the reaction of two or more components. This apparatus is especially suited to mix a small quantity of material with large amounts of material(s).

In order to describe more definitively many of the embodiments of this invention reference is made to FIGS. 1, 2A, 2B and 3. In discussing these Figures, the descriptions are purely illustrative and are not intended to be in any sense limiting. To those skilled in the art to which this invention relates, many changes in construction and different embodiments will suggest themselves without departing from the spirit and scope of the invention.

FIG. 1 is a cross sectional side view of the fluid injector mixing device.

FIG. 2A is a side view of cone 107 of FIG. 1.

FIG. 2B is an end view of cone 107 of FIG. 1.

FIG. 3 is a side view of housing 103.

Referring in detail to FIG. 1, there is illustrated a cross sectional view of the fluid injector mixing device which includes housing 103 containing cylindrical inlet tube 101, cylindrical handle 104, split compression sleeve 105 and cylindrical discharge tube 106. Threaded inlet port 102 allows material to pass into the mixing device then into tube 110 which is at an angle of about 15° in relation to the longitudinal axis of the mixing device, then into tube 112 which is at an angle of about 135° in relation to tube 110 and about 30° in relation to the longitudinal axis of the mixing device, then into annular groove 109. The material in groove 109 then flows into the groove 302 within the conical portion of housing 103. The groove 302 in the cone in conjunction with the mating outer cone comprise flow paths which can be longitudinally split.

The fingers or protrusions of mixer cone 107 direct the flow of material toward the center of the discharge tube 106 and also serve to divide the flow of materials from inlet tube 101 into discharge tube 106. Further, the geometry of the protrusions causes a disruption of the flow velocities of the major component flowing in via 101. The mixer cone 107 is tapered to an angle of about 15°. Also, the fingers or protrusions of mixer cone 107 allow the material flowing into inlet port 102 and then around said fingers of the mixer cone to be enveloped and entrained into the materials flowing through tube 106. The flow of material is from left to right as viewed in FIG. 1. These multiple flow paths have the following advantages: more efficient mixing since this enables the minor component to be dispersed simultaneously at a number of different points within the major component; if one of the grooves becomes blocked or damaged the others allow the apparatus to continue functioning. The design of the flow paths is such that all of the grooves are easily accessible for cleaning.

By the smearing and spreading action of the minor component against the inside surface of the protrusions, dispersion is enhanced and the major stream tends to entrain the minor component flowing from around the protrusions.

Preferably, the flow velocity of the materials through the grooves is approximately equal to the flow velocity of materials entering via 101.

Split cylindrical compression ring 105 is tapered on one end by which it provides a seal between itself, tube 106 which is also tapered on one end, mixer cone 107 and housing 103. O-ring 108 provides a further seal between the mixer cone 107 and the housing 103 to prevent material from back flowing through the threaded portion of housing 103.

To promote thorough and complete mixing, tube 106 may be fitted with static mixing sections.

The configuration shown in FIG. 1 illustrates an additional benefit in that all the materials pass through very rapidly thereby minimizing the residence time when used with a reactive material, and minimizing degradation of metering accuracy.

Inlet tube 101 and inlet port 102 are provided with suitable valving mechanisms, not shown, for controlling the flow of the materials. These materials generally flow into inlet tube 101 and inlet port 102 under pressure.

FIG. 2A depicts a side view of mixer cone 107 with protrusions 202. The cone is tapered to an angle of about 15°. FIG. 2B shows an end view of mixer cone 107 with protrusions 202.

FIG. 3 shows a side view of housing 103 showing the grooves 302 in the conical part of the housing.

The apparatus of this invention has no moving parts.

The apparatus of this invention is preferably used in combination with the apparatus described in copending U.S. Pat. No. 4,316,875 titled "Apparatus for Producing A Curable Polyurethane Froth", filed on the same date as this application by B. Barth, et al. and assigned to the same assignee as this invention. The apparatus described in said U.S. Pat. No. 4,316,875 is an apparatus for the continuous production of a curable polyurethane froth, which apparatus comprises separate sources of a polyol, an isocyanate, a urethane-forming catalyst and an inert gas, means including separate conduits for feeding said polyol, isocyanate and inert gas separately and under pressure at controlled flow rates from said sources to a mixing device containing inlet openings to receive said polyol, isocyanate and inert gas, means for mixing said polyol, isocyanate and inert gas to produce a froth, and an outlet opening for the resulting froth, means for delivering the froth from said mixing device to a second mixing device, a conduit for feeding the catalyst under pressure at a controlled flow rate to the second mixing device, and means for mixing the froth and catalyst, said mixing device containing inlet openings to receive the froth and catalyst inlet openings to receive the froth and catalyst and an outlet opening for the resulting catalyzed froth and means for delivering the catalyzed froth from the mixing device onto a substrate.

The apparatus of this invention can be used as the apparatus which mixes the froth and catalyst in the apparatus of U.S. Pat. No. 4,316,875.

The subject matter of U.S. Pat. No. 4,316,875 is incorporated herein by reference.

The apparatus of this invention is used to mix components, particularly when the components are reactive or to catalyze the reaction of one or more components. These components may be liquids, or in the form of a gas or froth. The apparatus of this invention may be used to mix, for example: liquid peroxides into liquid polyesters; adhesives and sealants, where it is desired to add small amounts of fluid components such as catalysts, adhesion promoters, toners and dyes; food additives in a continuous process. Preferably the apparatus of this invention is used to mix a curable polyurethane froth and a catalyst. The polyurethane froth and catalyst are described in copending U.S. Pat. No. 4,275,172 titled "A Frothable Polyurethane Composition and a Cellular Foam Produced Therefrom", filed on the same date as this application by B. Barth, et al. and assigned to the same assignee as this invention.

The curable polyurethane forming froth, as described in said U.S. Pat. No. 4,275,172, is prepared by mixing air or other gaseous substance with the polyol (including thixotrope and one or more optional ingredients), and the isocyanate. The catalyst is added to the froth produced by mixing the gas, polyol (including thixotrope and one or more optional ingredients) and isocyanate.

Suitable gaseous substances which are employed therein include any gaseous element, compound, or mixture thereof which exists in the gaseous state under standard conditions of temperature and pressure, i.e., 25° C. and one atmosphere, including for example, helium, nitrogen, oxygen, carbon dioxide and air, or mixtures thereof, provided such do not react with or significantly dissolve into any of the urethane forming components. Dry nitrogen or dry air is the preferred gas.

Specifically, in preparing the curable froth, the isocyanate, and the polyol containing thixotrope, and one or more of the optional ingredients such as a surfactant, a moisture absorbing material, a filler, a flame retardant additive, a dye, a pigment, or any other ingredient which would introduce an insignificant amount of moisture into the composition are metered separately and in fixed proportions into a mixer, preferably an SKG or Oakes continuous mixer. The gaseous material under pressure may be metered into either the polyol or isocyanate stream or into both or it may be metered directly into the mixer containing the polyurethane-forming components. A dense froth is formed in the mixer under a pressure which is above atmospheric pressure and from about 40 to about 150 psig. The froth expands in volume (i.e. describes in density) as the entrained air bubbles expand with decreased pressure as the foam proceeds towards the outlet of the delivery tube. The catalyst is injected into the froth at a point downstream in the delivery tube utilizing the apparatus of the present invention and dispersed by passing the froth/catalyst mixture through an in-line mixer. The catalyzed froth is then directed onto a substrate.

A preferable composition for producing the froth is described in said U.S. Pat. No. 4,275,172 and comprises a frothable therwosetting polyurethane-forming composition in which the density of the cured foam therefrom is essentially the same as the density of the froth composition, when cured such that at least one surface of the froth is exposed to the atmosphere, which composition comprises:

(a) a polyol,
(b) a polyisocyanate,
(c) a thixotroping agent,
(d) an inert gas,
(e) an amount of moisture available for reaction with the polyisocyanate that is less than that amount which would cause the composition to cure to a cellular polyurethane having a density which is not essentially the same density as that of the frothed composition.

The composition includes a catalyst and optionally one or more of the following: a surfactant, a moisture absorbing material, a filler, a flame retardant, a dye, a pigment, or any other ingredient which would introduce an insignificant amount of moisture into the composition.

The composition as described in U.S. Pat. No. 4,275,172 is preferably used in the form of three "packages", i.e., a polyol package which contains the polyol, thixotrope and one or more of the optional ingredients; an isocyanate package which contains the isocyanate; and a catalyst package which contains a catalyst which catalyzes the urethane-forming reaction, and a solvent for the catalyst. An inert gas is added to produce a froth.

U.S. Pat. No. 4,275,172 is incorporated herein by reference to describe the preparation of the froth.

The catalyst which is injected and mixed with the froth with the apparatus of this invention is described in said U.S. Pat. No. 4,275,172.

These catalysts include dialkyl tin carboxylates, such as dibutyl tin dilaurate, dioleate, diacetate, or di-2-ethylhexoate, and the like; dimethyl tin dithiolaurate, stannous octoate, stannous oleate, potassium octoate, potassium acetate, phenyl meruric propionate, iron (III)-acetyl acetonate, copper (II) acetyl acetonate, zinc octoate, zinc acetate, cobalt (II) acetate, manganese (II) acetate, isopropyl titanate, triacryl isopropyl titanate lead naphthanate, cobalt naphthanate, bismuth nitrate, ferric (III) chloride, sodium silicate, aluminum acetyl acetonate, zinc acetyl acetonate, nickel (II) acetyl acetonate, methyl titanate and zinc stearate.

Particularly effective catalysts are those with tin-sulfur bonds and include, for example, dibutyl tin sulfide, and the like, and dialkyl tin dithiodialkylidene diesters of the following formula:

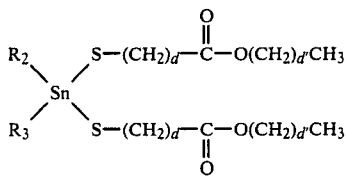

Wherein $R_2$ and $R_3$ are independently alkyl, aryl, and alkylaryl containing 1 to about 20 carbon atoms, and d is an integer of 1 to 8 and d' is an integer of from 1 to 10. Preferably, $R_2$ and $R_3$ is alkyl of 1 to 8 carbon atoms and d is an integer of 1 to 4.

Also, tertiary amines may be used as the catalyst. These tertiary amines can be illustrated by the following formula:

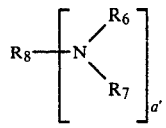

wherein $R_6$, $R_7$, and $R_8$ are independently selected from the group consisting of aryl, alkylaryl, arylalkyl, alkyl, cycloalkyl, alkenyl radicals wherein the aryl, alkylaryl and arylalkyl radicals contain from about 6 to about 20 carbon atoms, the alkyl radicals contain from 6 to 18 carbon atoms, the alkenyl radicals contain from about 3 to 18 carbon atoms, and saturated 5 and 6 membered heterocyclic radicals containing from one to three nitrogen atoms, a' is an integer of from 1 to 5.

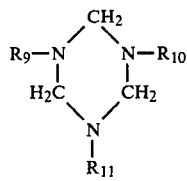

Wherein $R_9$, $R_{10}$ and $R_{11}$ are independently selected from

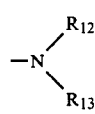

or monofunctional optionally substituted hydrocarbon radicals, with the proviso that at least one of $R_9$, $R_{10}$ or $R_{11}$ is a

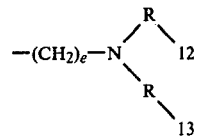

radical wherein $R_9$ and $R_{10}$ are selected from $C_1$ to $C_6$ alkyl, $C_2$ to $C_6$ hydroxyalkyl and e is 0 to 10. As examples of optionally substituted hydrocarbon radicals there may be mentioned morpholinoalkyl; piperidinoalkyl, alkylaminoalkyl; hydroxyalkyl; alkoxyalkyl and alkylcarbonyloxyalkyl. These triazine containing compounds are known in the art as shown for example in U.S. Pat. No. 3,884,917.

The amines suitable for use herein include triethylene diamine, N,N-dimethylcyclohexylamine, triethylamine, N-ethylmorpholine, N-methyl-2,2-dialkyl-1,3-oxazolidines, N-alkylpiperadines, N,N'-dialkypiperazines, tetramethyl-1,3-butane diamine, dimethylethanol amine, bis-dimethylamino diethyl ether, imidazole, N,N',N''-tris(3-dimethylaminopropyl)-S-hexahydrotriazine.

Also, mixtures of the above catalysts can be used.

The catalyst is used in amounts of as little as 0.01 parts by weight, to about 0.50 parts by weight, based on the weight of the polyol(s). The amount of catalyst used depends upon the froth temperature into which the catalyst is injected, the amount and alkalinity of any fillers present, the reactivity of the polyol(s) and the temperature of the substrate to which it is being applied. For example, a catalyst such as a dialkyl tin dithioalkylidene diester is used only in amounts of about 0.1 part when the froth temperature is about 40° C., and the substrate temperature (of a wall panel, for example) is about 25° C. When the froth temperature is lower than about 40° C., and the substrate temperature is lower than about 25° C., then more than 0.1 part and as much as 0.50 parts by weight of the catalyst per 100 parts of polyol(s) can be used.

The catalyst is generally added in a solvent. This solvent may be selected from a wide variety of materials. The solvent may be a polyol, a polyamine, a surfactant, or a plasticizer such as a dialkyl phthalate. Generally, the catalyst is dissolved in from about 10 to about 100 parts of solvent per part of catalyst.

The catalyst can be mixed with the solvent and this mixture added to the froth foam and mixed with the froth foam by the apparatus of this invention. When the catalyst is added in this manner it is dissolved in the solvent.

What is claimed is:

1. An apparatus for producing a mixture of chemical components which comprises an elongated housing defining an elongated cylindrical tube extending therethrough, said housing having a main body portion with one end of said inlet tube extending upstream of said main body portion and forming a first inlet means for supplying at least one component into said tube whereby said components flow from said inlet means to the other end of said tube, said other end of said tube extending downstream of said main body and forming an oulet means with the outer surface thereof being conical in shape, said outer conical surface of said outlet means having an upstream annular groove therein and communicating with a plurality of longitudinal grooves extending along the length of said conical surface, second inlet means in said housing communicating with said annular groove via passage means in said housing for supplying at least one component either reactive with one or more components from said first inlet means, or catalyzing the reaction of two or more components from said first inlet means, discharge tube means connected to the downstream end of said main body, and conically shaped, directing and distributing means, located within said discharge tube means cooperating with said outer conical surface of said outlet means for directing the components from said grooves into the flow of components in said tube, said directing and distributing means extending into the flow path of said outlet means for mixing the components from said first and second inlet means.

2. An apparatus as described in claim 1, wherein the directing and distributing means have protrusions extending into the flow path of the oulet means for mixing the components from the first and second inlet means.

* * * * *